US008386177B2

(12) United States Patent
Wu

(10) Patent No.: US 8,386,177 B2
(45) Date of Patent: Feb. 26, 2013

(54) VEHICLE-DISPATCHING METHOD AND VEHICLE-DISPATCHING SYSTEM

(75) Inventor: Jason Wu, Taipei (TW)

(73) Assignee: Taiwan Mobile Communication, Taipei (TW)

( * ) Notice: Subject to any disclaimer, the term of this patent is extended or adjusted under 35 U.S.C. 154(b) by 260 days.

(21) Appl. No.: 12/779,593

(22) Filed: May 13, 2010

(65) Prior Publication Data
US 2010/0293030 A1 Nov. 18, 2010

(30) Foreign Application Priority Data

May 13, 2009 (TW) .............................. 98115883 A
Apr. 23, 2010 (TW) .............................. 99112958 A

(51) Int. Cl.
G08G 1/123 (2006.01)
(52) U.S. Cl. ..................... 701/519; 340/539.18; 707/748
(58) Field of Classification Search .................. 701/519, 701/522, 537, 540; 707/748; 340/539.18
See application file for complete search history.

(56) References Cited

U.S. PATENT DOCUMENTS

| 4,928,099 | A | * | 5/1990 | Drake ...................... 340/539.18 |
| 5,428,679 | A | * | 6/1995 | French ..................... 379/201.04 |
| 5,835,376 | A | * | 11/1998 | Smith et al. ................... 701/117 |
| 6,259,405 | B1 | * | 7/2001 | Stewart et al. ................. 342/457 |
| 6,339,745 | B1 | * | 1/2002 | Novik ........................... 701/431 |
| 6,615,046 | B1 | * | 9/2003 | Ur .................................. 455/445 |
| 6,734,823 | B2 | * | 5/2004 | Mintz et al. .................... 342/463 |
| 7,598,889 | B2 | * | 10/2009 | Maeda et al. ............. 340/995.27 |
| 2002/0174003 | A1 | * | 11/2002 | Redmann et al. ................. 705/8 |
| 2008/0228562 | A1 | * | 9/2008 | Smith et al. ...................... 705/13 |
| 2009/0083111 | A1 | * | 3/2009 | Carr ................................. 705/9 |
| 2009/0177502 | A1 | * | 7/2009 | Doinoff et al. .................... 705/5 |

FOREIGN PATENT DOCUMENTS

| CN | 1484206 A | 3/2004 |
| CN | 1588476 A | 3/2005 |

* cited by examiner

Primary Examiner — Drew Brown
Assistant Examiner — Barry Gooden, Jr.
(74) Attorney, Agent, or Firm — Kirton McConkie; Evan R. Witt

(57) ABSTRACT

A vehicle-dispatching system includes a service center and a plurality of hosts disposed in respective vehicles. For equally distributing the chances of accepting a reserved vehicle service task, a vehicle-dispatching method is provided. Firstly, the service center is in communication with the hosts of respective vehicles, thereby establishing a database and a dispatching priority ranking table. When the service center receives a vehicle service request, a vehicle is selected from the database according to the dispatching priority ranking table. If the host of the selected vehicle receives the inquiry signal and consents to accept a vehicle service task, a vehicle service confirming signal is issued from the host of the selected vehicle. When the service center receives the vehicle service confirming signal from the host of the selected vehicle, the host of the selected vehicle is adjusted to a lower priority ranking in the dispatching priority ranking table.

22 Claims, 9 Drawing Sheets

VEHICLE-DISPATCHING METHOD AND VEHICLE-DISPATCHING SYSTEM

FIELD OF THE INVENTION

The present invention relates to a vehicle-dispatching method and a vehicle-dispatching system, and more particularly to a vehicle-dispatching method and a vehicle-dispatching system for dispatching taxis or freight train.

BACKGROUND OF THE INVENTION

In busy metropolis, one of the most popular transportation tools is a taxi, which is advantageous in providing door-to-door service. To dispatch a taxi to a passenger dynamically but readily, a current practice is that a vehicle-dispatching center inquires the task-taking wishes of all the taxi drivers belonging to the same network by wireless communication when a taxi call message from a passenger is received through a phone call or online request. Then, on the basis of different coordinating conditions, one of the responsive taxis is selected to pick up the passenger. Generally, the vehicle-dispatching center gives service to different vehicle-dispatching companies. Therefore, there is a need of providing a vehicle-dispatching method and a vehicle-dispatching system for equally distributing the chances of inquiring the vehicle service task-taking wish from the vehicles of different vehicle-dispatching companies.

SUMMARY OF THE INVENTION

The present invention provides a vehicle-dispatching method and a vehicle-dispatching system for equally distributing the chances of accepting the reserved vehicle service task.

The present invention also provides a vehicle-dispatching method and a vehicle-dispatching system for dispatching vehicles matching specific conditions corresponding to a vehicle service request.

In accordance with an aspect of the present invention, a vehicle-dispatching method is used with a service center and a plurality of vehicles. The vehicle-dispatching method includes steps of: communicating the service center with hosts of respective vehicles to establish a database and a dispatching priority ranking table in the service center, selecting a vehicle from the database according to the dispatching priority ranking table when the service center receives a vehicle service request, issuing an inquiry signal from the service center to the host of the selected vehicle, issuing a vehicle service confirming signal from the host of the selected vehicle if the host of the selected vehicle receives the inquiry signal and consents to accept a vehicle service task, and adjusting the host of selected vehicle to a lower priority ranking in the dispatching priority ranking table when the service center receives the vehicle service confirming signal from the host of the selected vehicle.

In accordance with another aspect of the present invention, a vehicle-dispatching system is used with a plurality of vehicles. The vehicle-dispatching system includes a plurality of hosts and service center. The hosts are disposed in respective vehicles. The service center communicates with the hosts, thereby establishing a database and a dispatching priority ranking table in the service center. The service center selects a vehicle from the database according to the dispatching priority ranking table when the service center receives a vehicle service request. An inquiry signal is issued from the service center to the host of the selected vehicle. The host of the selected vehicle is adjusted to a lower priority ranking in the dispatching priority ranking table when the service center receives a vehicle service confirming signal from the host of the selected vehicle.

In accordance with a further aspect of the present invention, a vehicle-dispatching method is used with a service center and a plurality of vehicles. The vehicle-dispatching method includes steps of: communicating the service center with hosts of respective vehicles, thereby establishing a database in the service center, wherein the database includes dispatching condition sets of respective vehicles; selecting a vehicle from the database according to a vehicle-requiring condition corresponding to a vehicle service request when the service center receives the vehicle service request; and issuing an inquiry signal from the service center to the host of the selected vehicle.

In accordance with a further aspect of the present invention, a vehicle-dispatching system is used with a plurality of vehicles. The vehicle-dispatching system includes a plurality of hosts and service center. The hosts are disposed in respective vehicles. The service center communicates with the hosts to establish a database in the service center and the database includes dispatching condition sets of respective vehicles. When the service center receives a vehicle service request, the service center selects a vehicle from the database according to a vehicle-requiring condition corresponding to the vehicle service request, and the service center issues an inquiry signal to the host of the selected vehicle.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
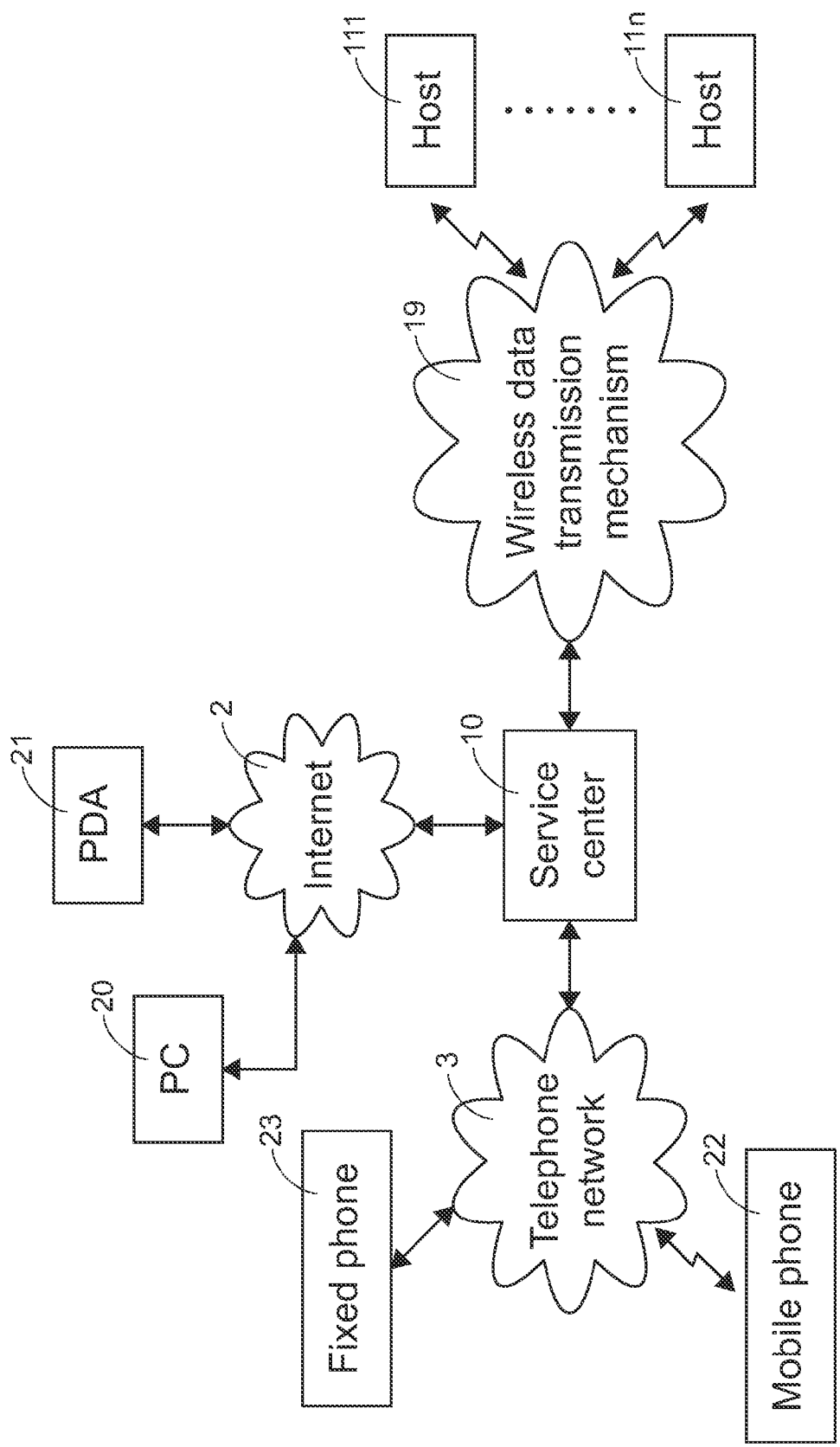
FIG. 1 is a functional block diagram illustrating a vehicle-dispatching system according to an embodiment of the present invention.

FIG. 1 is a functional block diagram illustrating a vehicle-dispatching system according to an embodiment of the present invention. The system comprises a service center 10 and a plurality of hosts 111~11n. The service center 10 has the ability of receiving and issuing a variety of information. The hosts 111~11n are in communication with the service center 10. As shown in FIG. 1, the service center 10 is connected with the Internet 2 and a telephone network 3. The service center 10 may receive a vehicle-request phone call through the telephone network 3 or a vehicle online request through the Internet 2 from a user device such as a personal computer 20, a personal digital assistant (PDA) 21, a mobile phone 22 or a fixed phone 23. For example, the vehicle service request may be directly entered through a telephonic audio system of the service center 10 or conveyed to service personnel in the service center 10. Alternatively, the vehicle service request may also be a text or voice message entered through the personal computer 20, the PDA 21, the mobile phone 22 or the fixed phone 23. Generally, the information entered by the customer includes, for example, the pick-up location and/or the drop-off destination.

The hosts 111~11n are disposed in respective taxis, and are all communicable with the service center 10 through a wireless data transmission mechanism 19. For example, a host may transmit data to the service center 10 through general packet radio service (GPRS) of a mobile phone network. Of course, the emerging third generation (3G) mobile phone network, worldwide interoperability for microwave access (WiMAX), Wi-Fi or other wireless networks may be other options of wireless data transmission mechanisms. For readily exchanging information of locations, each host exhibits a positioning function. For example, each host may include functions of a GPS device for receiving satellite positioning signals, or a mobile positioning service provided by a mobile phone or wireless network base station. In addition, the host is preferably capable of sending a message of occupancy status, i.e. whether the taxi is vacant or not, to the service center 10 through the above-mentioned wireless data transmission mechanism 19, so as to facilitate the service center 10 to manage the taxis.

When the service center 10 receives a real-time vehicle service request from the customer, it is necessary to immediately pick up the customer. As such, the service center 10 will automatically search one or more taxis available for dispatching in vicinity of the customer according to the information acquired from the customer and the information received from the hosts. After receiving a vehicle service request from a customer, the service center issues a message associated with the location information included in the vehicle service request, e.g. pick-up location and/or the drop-off destination, to a plurality of hosts. Afterwards, the service center selects one of the vehicles which send back the task-accepting signals, and issues a dispatching signal to the host of the selected vehicle.

Figure 2:
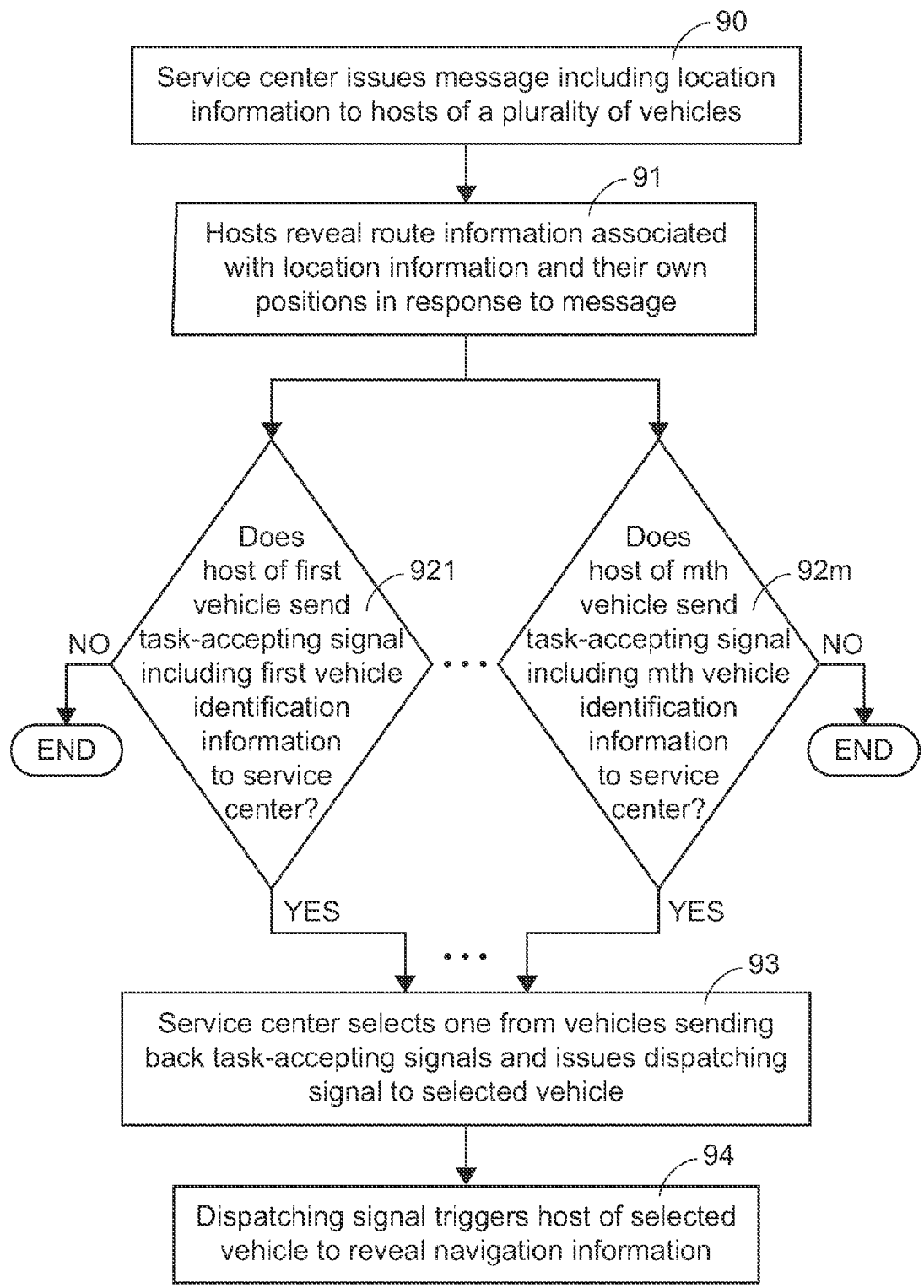
FIG. 2 is a flowchart illustrating a vehicle-dispatching method according to an embodiment of the present invention.

FIG. 2 is a flowchart illustrating a vehicle-dispatching method according to an embodiment of the present invention. After receiving a vehicle service request from a customer, the service center issues a message associated with the location information included in the vehicle service request, e.g. pick-up location and/or the drop-off destination, to a plurality of hosts (Step 90). In response to the message, each host receiving the message will automatically reveal route information associated with the location information and the current position of the vehicle (Step 91). The drivers may refer to the route information to decide whether to accept the task or not. Those who are willing to accept the task then trigger the hosts to send a task-accepting signal along with vehicle identification information (e.g. a registration number of the vehicle) back to the service center (Step 921~92m). The service center then selects one of the vehicles which send back the task-accepting signals, and issues a dispatching signal to the host of the selected vehicle (Step 93). In response to the dispatching signal, the host automatically reveals navigating information for the reference of the vehicle driver (Step 94).

Figure 3:
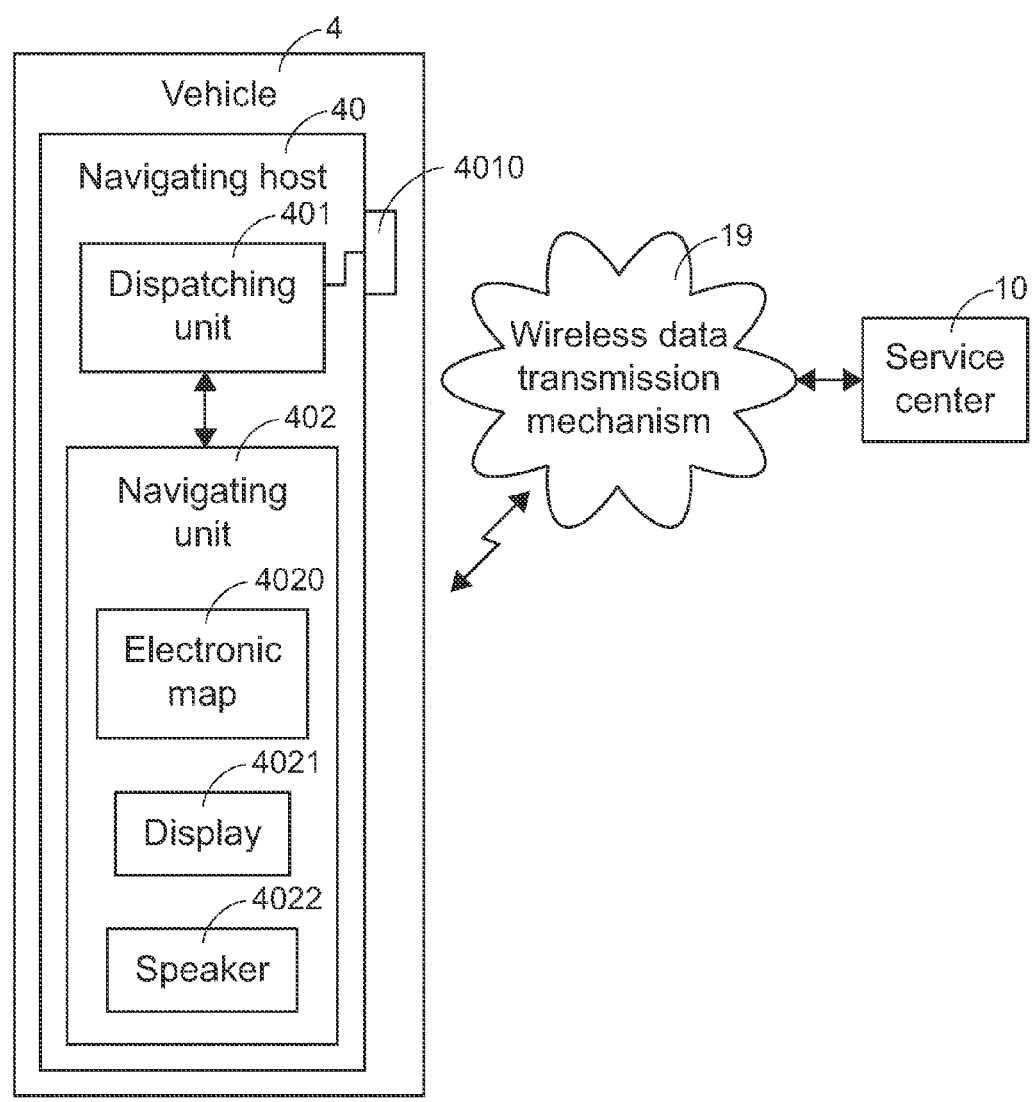
FIG. 3 is a functional block diagram illustrating an exemplary host used in a vehicle-dispatching system of the present invention.

FIG. 3 is a functional block diagram illustrating an exemplary host used in a vehicle-dispatching system of the present invention. As shown in FIG. 3, a host 40 is disposed in a vehicle 4 and communicates with the service center 10 through the wireless data transmission mechanism 19. The host 40 mainly includes a dispatching unit 401 and a navigating unit 402. The dispatching unit 401 is used for receiving the message from the service center 10 and decoding the location information included in the message. Once the driver is willing to accept the task, he triggers the dispatching unit 401 of the host 40 to send a task-accepting signal back to the service center 10. If the vehicle is selected, the dispatching unit 401 will receive a dispatching signal from the service center 10. In this embodiment, the action performed by the wireless data transmission mechanism to transmit the data to the service center, for example, is GPRS of a mobile phone network. Of course, the emerging 3G mobile phone network, WiMAX, Wi-Fi, or other wireless networks may be alternative options. On the other hand, the navigating unit 402 exhibits the function of positioning mainly and built therein an electronic map 4020, a display 4021, and a speaker 4022. The navigating unit 402 may be integrated with the dispatching unit 401 and disposed in the same casing, or it may be disposed in a casing separate from the casing of the dispatching unit 401. The communication of the navigating unit 402 with the dispatching unit 401 may be accomplished through a signal transmission cable, wireless Bluetooth, or any other suitable short-distance wireless transmission means. The navigating unit 402 is designed to be able to receive and process the location information output from the dispatching unit 401. In addition, the navigating unit 402 may use the display 4021 and the speaker 4022 to automatically reveal the route information in response to the vehicle-request message and automatically reveal the navigating information for the reference of the vehicle driver in response to the dispatching signal.

In the above embodiment, the location information provided by the service center may include literal addresses of pick-up and/or drop-off locations or longitude and latitude coordinates corresponding to the addresses. When the hosts of the vehicles available for dispatching receive the location information, recommended routes starting from the current positions of respective vehicles are shown on the display 4021 with the electronic maps in the hosts. In addition, the estimated distance of the recommended route and the estimated time to spend may also be revealed.

Figure 4A:
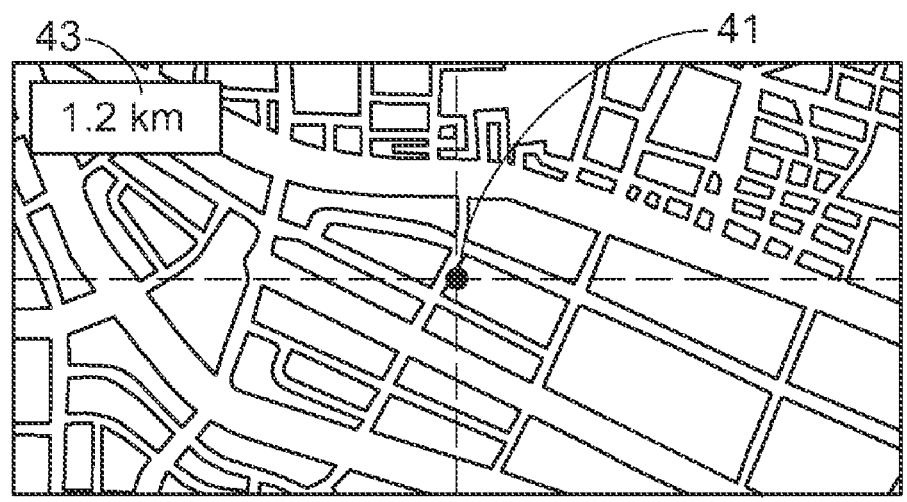
FIG. 4A~FIG. 4D are examples of maps shown on a navigating unit of the present invention to reveal route information.
Figure 4B:
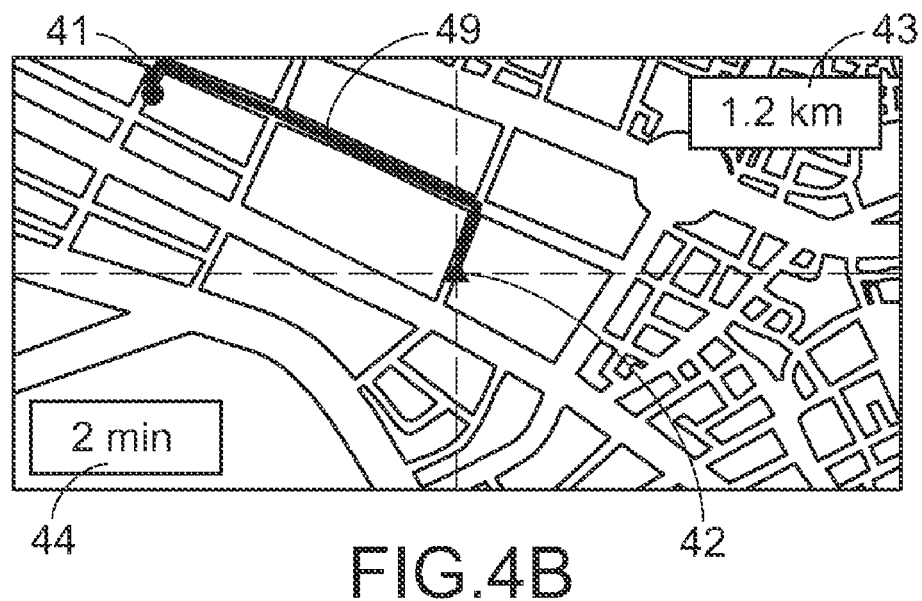
Figure 4C:
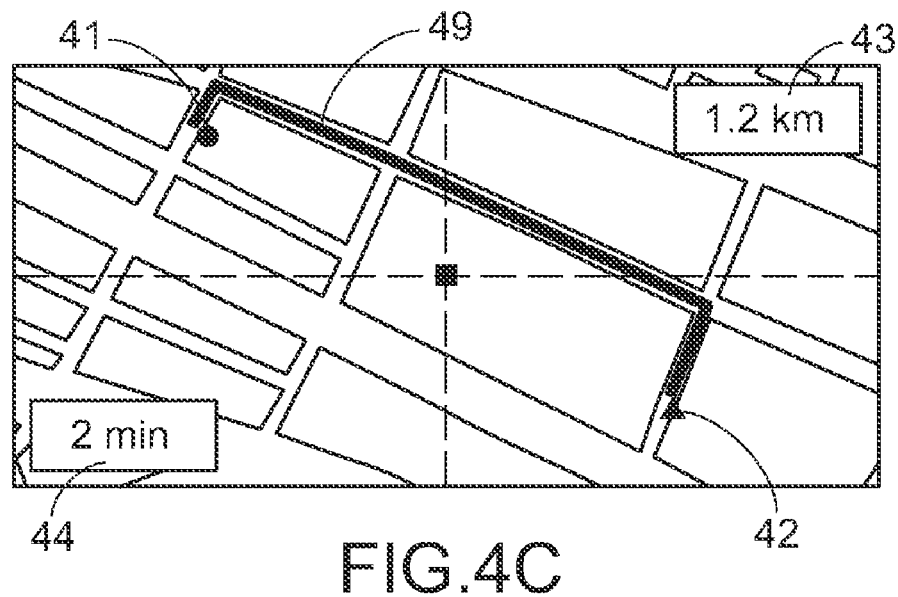
Figure 4D:
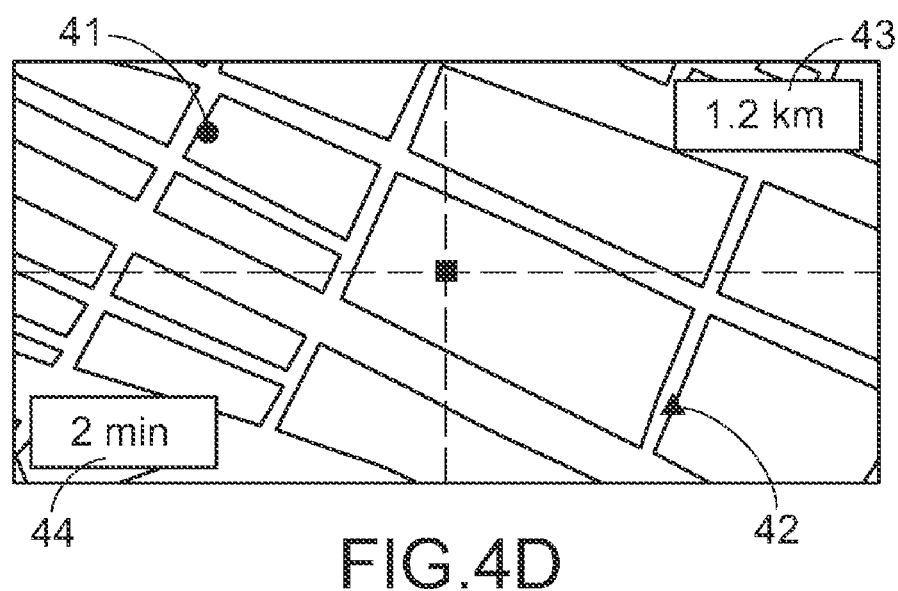

To obtain the best legibility for the driver, the resolution of the route map is adjusted to the optimal resolution while being capable of simultaneously showing the current position of the vehicle and the pick-up and/or drop-off locations on the display. Please refer to the examples as illustrated in FIGS. 4A, 4B, 4C and 4D. FIG. 4A illustrates a map marked with the pick-up location 41 and the estimated distance 43 from the current position of the vehicle to the pick-up location. Accordingly, the vehicle driver may decide whether to accept the task or not. FIG. 4B illustrates a route map marked with the current position 42 of the vehicle, the pick-up location 41 and a recommended route 49 connecting the current position 42 of the vehicle and the pick-up location 41. In addition, the estimated distance 43 and the estimated time 44 required for reaching the customer are also shown. In this example, the current position 42 of the vehicle is placed at the center of the display. FIG. 4C illustrates another route map marked with the same information as that in FIG. 4B, including the current position 42 of the vehicle, the pick-up location 41, the recommended route 49, the estimated distance 43 and the estimated time 44. In this example, a middle point of a hidden straight line connecting the current position 42 of the vehicle and the pick-up location 41 is placed at the center of the display. It is advantageous in locally enlarging the recommended route in the map to maximize resolution. Of course, it is also feasible to show a map on the display, as shown in FIG. 4D, in which only the current position 42 of the vehicle and the pick-up location 41 are shown without scheduling any route.

The estimated distance 43 and the estimated time 44 required for reaching the customer are calculated by the navigating unit 402. Alternatively, the route information may include the estimated miles or estimated time starting from the current position 42 of the vehicle to the pick-up location 41. The route information may also be selectively revealed in an audio form through a speaker. For example, it is announced through the speaker, "Pick up at No. 100, Section 2, Bade Road, Taipei, about 1.2 kilometer and 2 minutes from here." Accordingly, the vehicle driver may understand the route information shown on the route map of the display or revealed in an audio form.

Once the route information is conveyed to all the associated drivers with the transmission of the message from the service center, the one who is willing to accept the task just needs to trigger the button 4010 on the dispatching unit 401 in his host to send a task-accepting signal with the vehicle identification information (e.g. the registration number of the vehicle) back to the service center. Preferably, the service center is also informed of the time estimated by the driver to arrive at the pick-up location. On basis of the returned information and a criterion, the service center selects a vehicle to pick up the passenger by issuing a dispatching signal to the host of the selected vehicle. For example, the criterion includes the order of receiving the task-accepting signals, the vehicle weights, and the estimated distances to the pick-up location. In a case that only the order of receiving the task-accepting signals is taken into consideration, the vehicle weights and the estimated distances are disregarded. Alternatively, the service center may select a vehicle having the highest weight among a plurality of vehicles within a certain distance range, and then issue a dispatching signal to the host of the selected vehicle.

The dispatching signal includes a navigating startup signal to trigger the host to automatically reveal the navigating information for the reference of the vehicle driver. The navigating information can be revealed in existing manners that are exhibited by the navigating unit of the host, e.g. navigating image, sound, or any other suitable forms. That is, once a vehicle is selected by the service center, the host of the vehicle will start the function of navigation without the manual triggering of the driver to assist the driver to readily arrive at the pick-up location. Furthermore, the dispatching signal may include the information of drop-off destination so that the host continues to perform navigation up to the arrival at the drop-off destination. In this way, there is no need at all for the driver to manually operate the navigating means, and the only thing the driver needs to do through the entire process is to trigger the host to send the task-accepting signal to the service center when the driver decides to accept the task. Accompanied with the output of the dispatching signal, the service center outputs a task-accepting notice to notify the customer. The notice can be a voice or text message and includes the vehicle identification information and the estimated time the customer needs to wait.

Figure 5:
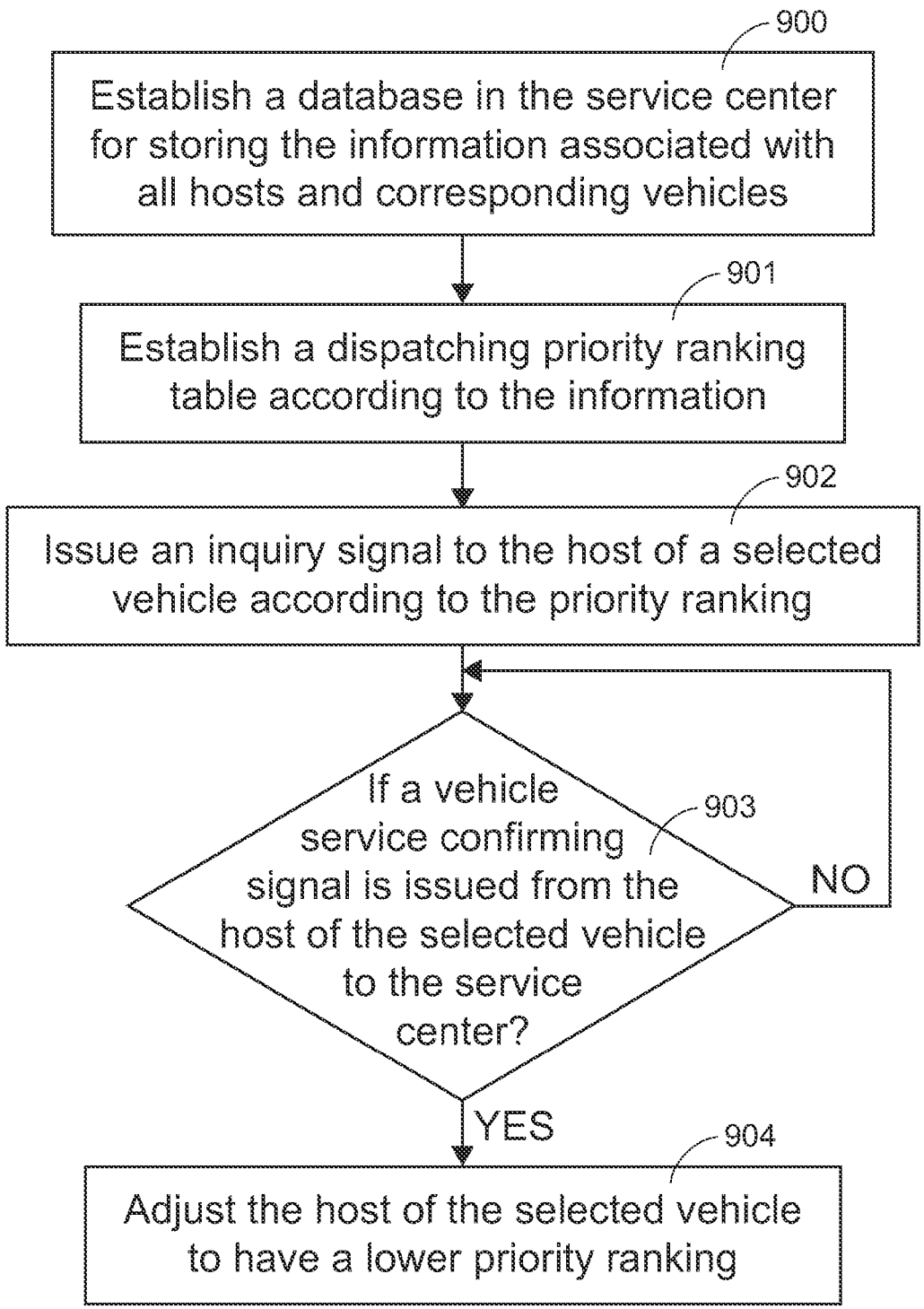
FIG. 5 is a flowchart illustrating a vehicle-dispatching method for equally distributing the chances of accepting the reserved vehicle service task according to the present invention.

The vehicle-dispatching method, however, is not feasible to determine the vehicle weights associated with reserved vehicle service request. Since the timing of picking up the passenger is usually several hours or several days subsequent to the receipt of the reserved vehicle service request, the taxis in vicinity of the customer at the time of issuing the reserved vehicle service request are not suitably dispatched. Moreover, since the reserved vehicle service needs long-term transportation expense, equal distribution is a major consideration. Hereinafter, a vehicle-dispatching method for equally distributing the chances of accepting the reserved vehicle service task will be illustrated in more details with reference to the flowchart of FIG. 5.

First of all, a database 101 is established in the service center 10 (Step 900). The database 101 stores the information associated with all hosts and corresponding vehicles. According to the information associated with all hosts and corresponding vehicles, a dispatching priority ranking table is established in the database (Step 901). The contents of the dispatching priority ranking table include the relationship between an identification code of each host and a corresponding priority value. Next, an inquiry signal is issued from the service center to the host of a selected vehicle according to the priority ranking (Step 902). If a vehicle service confirming signal is issued from the host of the selected vehicle to the service center (Step 903), the host of the selected vehicle is adjusted to have a lower priority ranking (Step 904).

An exemplary dispatching priority ranking table is shown in Table 1. For example, a dispatching priority ranking table includes identification codes 0~99 corresponding to 100 counts of hosts, respectively. These hosts are disposed in respective taxis. As shown in the dispatching priority ranking table, the hosts with respective identification codes 0~99 have respective priority values, which are ranged from 0 to 99.

TABLE 1

| Identification code | 0 | 1 | 2 | 3 | ... | 97 | 98 | 99 |
|---|---|---|---|---|---|---|---|---|
| Priority value | 97 | 23 | 14 | 0 | ... | 7 | 65 | 33 |

The priority value is directed to the priority ranking of inquiring the reserved vehicle service task-taking wish of picking up the passenger. In this embodiment, the lower priority value indicates a higher priority ranking. That is, the host with the identification code 3 has the highest priority ranking of inquiring the reserved vehicle service task-taking wish of picking up the passenger according to the dispatching priority ranking table. Once the service center 10 receives a vehicle service confirming signal from the host with the identification code 3, the host with the identification code 3 will be adjusted to have a lower priority ranking in the dispatching priority ranking table. For example, the host with the identification code 3 is adjusted to have the lowest priority ranking (priority value=99). Since the vehicle weights could be represented by the priority values, the chances of accepting the reserved vehicle service task could be equally distributed.

The dispatching priority ranking table could be determined according to the following criteria. For quickly responding to the vehicle service request of the customer, the hosts that are enabled and in communication with the service center 10 are listed in the dispatching priority ranking table. That is, if the hosts are not enabled or disconnected from the service center 10, the hosts will be temporarily rejected from the dispatching priority ranking table. Until the hosts are enabled and in communication with the service center 10 again, the hosts are restored to be added to the dispatching priority ranking table. Alternatively, if a host has not been in communication with the service center 10 for a total time period longer than a threshold value, the priority value of the host is added by n. For example, n=99999 and thus the host has the lowest priority ranking Alternatively, if an enabled host communicating with the service center 10 has not responded to the service center 10 for more than specified counts of times, the priority value of the host is added by n. For example, n=99999 and thus the host has the lowest priority ranking. The above criteria could encourage the drives to turn on the hosts and accept the vehicle service task. As a consequence, the service center 10 could be in charge of the tracks of the vehicles, and select one of the vehicles to accept the vehicle service task.

Figure 6:
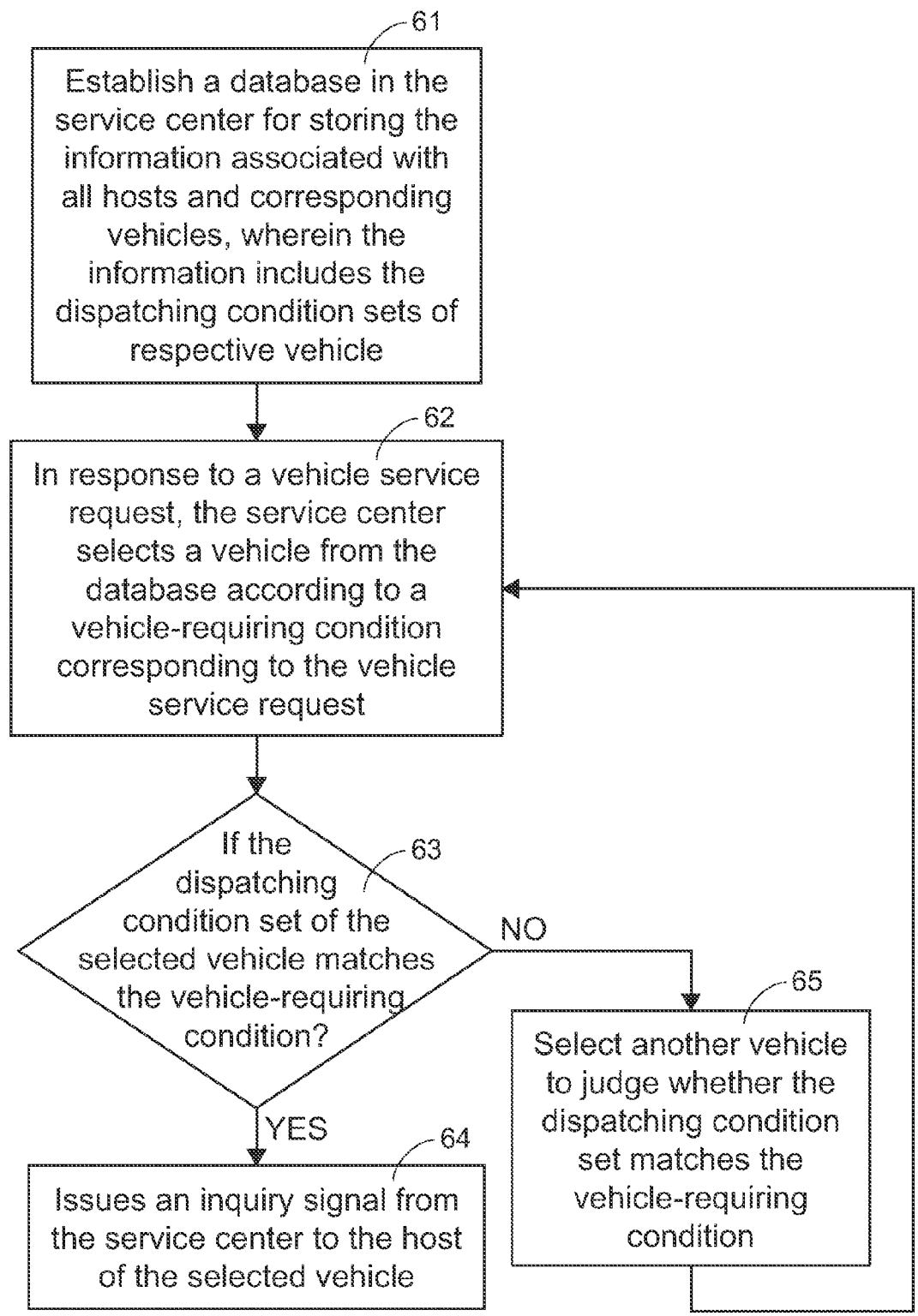
FIG. 6 is a flowchart illustrating a vehicle-dispatching method for helping the passenger quickly select a proper vehicle according to the present invention.

Moreover, the present invention also provides another vehicle-dispatching method for helping the passenger quickly select a proper vehicle. Hereinafter, the vehicle-dispatching method for helping the passenger quickly select a proper vehicle will be illustrated with reference to the flowchart of FIG. 6. First of all, a database 101 is established in the service center 10 for storing the information associated with all hosts and corresponding vehicles, wherein the information includes dispatching condition sets of respective vehicles (Step 61). In response to a vehicle service request, the service center 10 selects a vehicle from the database 101 according to a vehicle-requiring condition corresponding to the vehicle service request (Step 62). If the dispatching condition set of the selected vehicle in the database 101 matches the vehicle-requiring condition (Step 63), the service center issues an inquiry signal to the host of the selected vehicle (Step 64). Whereas, once the dispatching condition set of the selected vehicle does not match the vehicle-requiring condition, no inquiry signal is issued from the service center to the host of the selected vehicle (Step 65), and another vehicle is selected (Step 62) to judge whether the dispatching condition set matches the vehicle-requiring condition (Step 63).

For example, since the vehicle driver needs sufficient time to take a rest, a task-accepting time may be included in the dispatching condition set. The task-accepting time may be actively inputted and modified via the host of the vehicle, a network-enabled personal computer, a mobile communication device using a 3G mobile phone network, a WiMAX wireless network or a Wi-Fi wireless network. In addition, the task-accepting time may be uploaded to the service center 10 for storage. Of course, the driver may input and upload the recess date and recess time to the service center 10 for storage. As such, no matter whether the host of the vehicle is enabled and in communication with the service center, if the scheduled time of the reserved vehicle service task is within the registered recess time of the host, the host of the vehicle will not be inquired by the service center. In other words, even if no reconfirming message is sent back to the service center, the host is suffered from punishment of lowering the priority ranking for example. Since the recess time could be inputted into the host by the driver without the help of the workers in the service center, the driver may alter the recess time at will. In this situation, the flexibility of making use of time is enhanced, and the probability of vehicle-dispatching success is increased.

Moreover, for helping the passenger quickly select a proper vehicle, the dispatching condition set of each vehicle registered in the service center may include the following information: a foreign language communicable vehicle (e.g. an English communicable vehicle or a Japanese communicable vehicle), a trunk-empty vehicle capable of providing a long-distance trip service (possibly with relatively expensive fare, e.g. airport pickup service), a credit-card acceptable vehicle, a vehicle having a facility (e.g. a wheelchair storing facility) for elderly passengers, a large-sized vehicle having an air displacement greater than a threshold value, a vehicle having an age lower than two years, a high-quality vehicle with no customer complaint, or the like. In particular, the dispatching condition set may indicate whether a vehicle is an EasyCard acceptable vehicle. EasyCard is a contactless smart card supporting small payment and is widely used in Taiwan, especially for transport-related service. Certainly, the present invention can be applied to any other contact or contactless smart card supporting any known payment mechanism which is used in a vehicle. The service center 10 has the ability of receiving and issuing a variety of information. For example, the vehicle service request may be directly entered through a telephonic audio system of the service center 10 or conveyed to service personnel in the service center 10. Alternatively, the vehicle service request may also be a text or voice message entered through the personal computer 20, the PDA 21, the mobile phone 22 or the fixed phone 23. After the vehicle service request is transmitted to the service center 10, a specified vehicle-requiring condition corresponding to the vehicle service request of the customer is realized by the service center 10. According to the specified vehicle-requiring condition, the service center 10 will execute the following selective mechanism.

Figure 7:
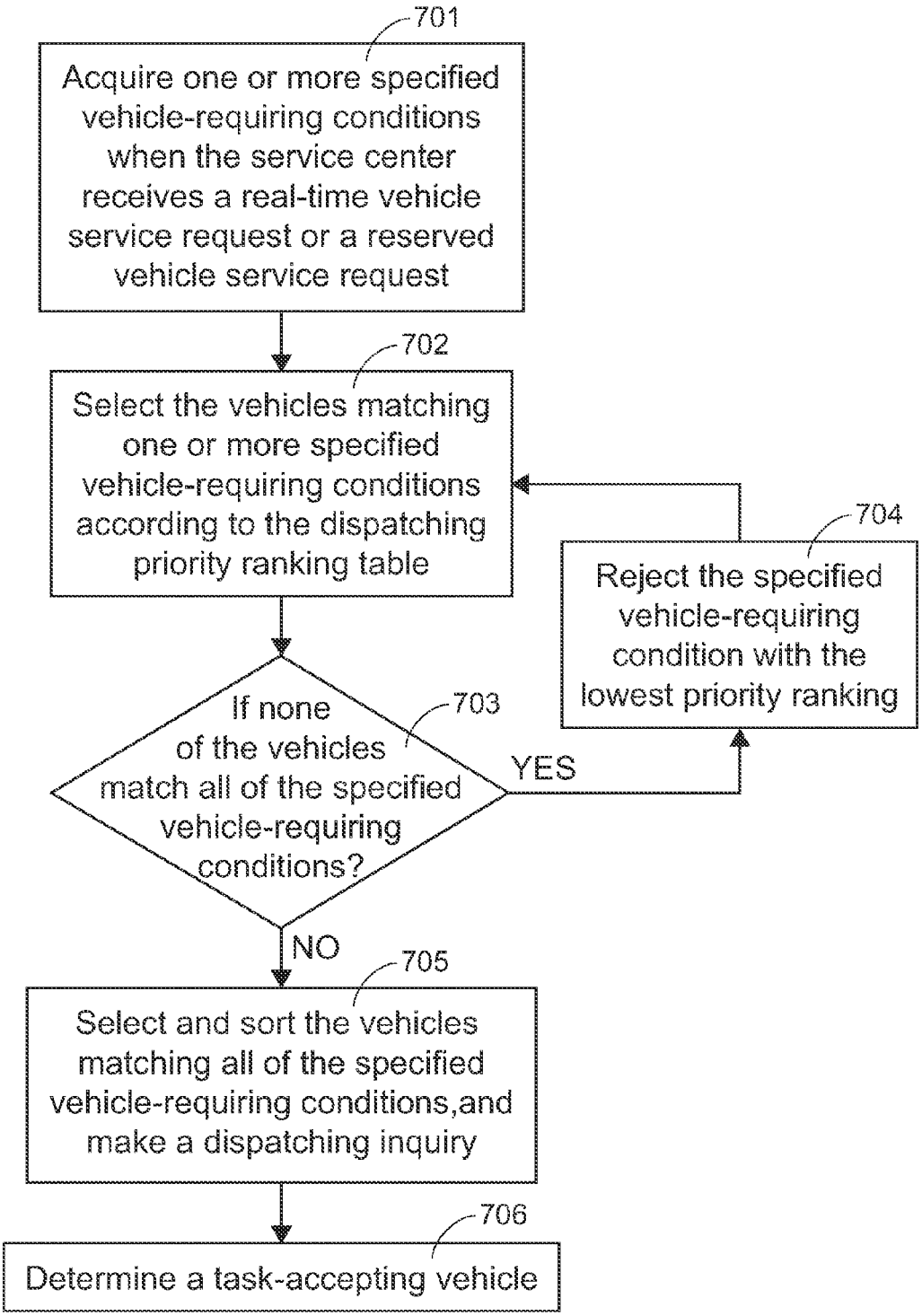
FIG. 7 is a flowchart illustrating a method of executing a selective mechanism for determining a task-accepting vehicle according to the specified vehicle-requiring condition.

FIG. 7 is a flowchart illustrating a method of executing a selective mechanism for determining a task-accepting vehicle according to the specified vehicle-requiring condition. First of all, when the service center 10 receives a real-time vehicle service request or a reserved vehicle service request from the customer, one or more specified vehicle-requiring conditions are acquired (Step 701). Then, the vehicles matching the one or more specified vehicle-requiring conditions are selected according to the dispatching priority ranking table (Step 702). If none of the vehicles match all of the specified vehicle-requiring conditions (Step 703), the specified vehicle-requiring condition with the lowest priority ranking is rejected (Step 704), and then Step 702 is repeatedly done. Otherwise, the vehicles matching all of the specified vehicle-requiring conditions are selected and sorted, and an inquiry signal is issued from the service center to selected vehicles according to the priority ranking (Step 705). Afterwards, a task-accepting vehicle is determined (Step 706).

The specified vehicle-requiring conditions may be acquired by the service center 10 and stored in the service center 10 when a real-time vehicle service request or a reserved vehicle service request of the customer is transmitted to the service center 10 through a phone call, a short message or the Internet. As a consequence, when the same customer sends a real-time vehicle service request or a reserved vehicle service request for the next time, the specified vehicle-requiring conditions are immediately acquired. Moreover, by the service center 10, the vehicle-requiring conditions may be classified into two types: an absolute vehicle-requiring condition and a preferential vehicle-requiring condition. The vehicles whose dispatching condition sets do not match the absolute vehicle-requiring condition are not selected from the database. Whereas, the vehicles whose dispatching condition sets do not match the preferential vehicle-requiring condition may still be selected. In a case that many specified vehicle-requiring conditions are assigned, the preferential vehicle-requiring condition has the lower priority ranking but the absolute vehicle-requiring condition has the higher priority ranking. As such, the vehicles matching the absolute vehicle-requiring condition and optionally matching the preferential vehicle-requiring condition will be searched.

As above mentioned, the task-accepting time (or the access time) may be actively inputted and modified via the host of the vehicle, and transmitted to the service center 10. Moreover, the data associated with the district group may be inputted via the host of the vehicle, and transmitted to the service center 10 for modification. Moreover, according to the metropolitan districts, the service-covering area of the overall vehicle-dispatching company may be classified into several large districts, and each large district is divided into several sub-districts. For example, Taiwan may be divided into several large districts such as Taipei, Taichung, Tainan, Kaohsiung, and so on. In addition, Taipei may be divided into several sub-districts such as an east sub-district, a south sub-district, a west sub-district and a north sub-district. According to the practical requirements, the vehicles of the vehicle-dispatching company may join one of the large districts (e.g. Taipei). As such, after a host of a vehicle belonging to the large district Taipei is enabled and in communication with the service center 10, the service center 10 will only provide selective items of the east, west, south and north sub-districts to the host of the vehicle for display. Via the selective items, the driver may choose one or more sub-districts (e.g. the east sub-district and the south sub-district) as the service-covering area.

Moreover, the hosts of the vehicles included in the dispatching priority ranking table could be classified into several groups according to the sub-districts. In a case that the host of the vehicle chooses the east sub-district and the south sub-district as the service-covering area, the host is allocated to the dispatching priority ranking table belonging to the east sub-district and the south sub-district for sorting. As such, the service center may issue an inquiry signal to a selected vehicle according to the dispatching priority ranking table of a desired group. By the way, during the hosts of the vehicles are classified into several groups, the identification codes of a host in different groups may identical or different.

In a case that the vehicle service request issued from the customer is not real-time and the timing of picking up the passenger is not too long (e.g. several tens of minutes or one or two hours) after a reserved vehicle service request is received, the service center may issue an inquiry signal to the hosts which belongs to the group corresponding to the pick-up location of the passenger and could reach the pick-up location at the scheduled time. For example, assuming that the pick-up location of the passenger is in the east sub-district of the large district Taipei, the service center may issue an inquiry signal to the hosts which belonging to the group corresponding to the east sub-district of Taipei.

Moreover, for assuring that the selected vehicle could reach the pick-up location of the passenger on time, the service center may sequentially issue inquiry signals to several hosts within a reachable distance from the pick-up location according to the priority ranking. For example, the specified distance is equal to a designated time required for reaching the pick-up location multiplied by a predetermined velocity (e.g. 0.5 km per minute). Moreover, the vehicle is also selected according to the vehicle-dispatching method as described in FIG. 6.

In a case that the scheduled time is shorter than a threshold time value (e.g. 90 minutes), the following selective mechanism is used for selecting a vehicle to accept the reserved vehicle service task. The threshold time value in the dispatching priority ranking table is determined according to the size of the district which the vehicle belongs to. For example, assuming that the average time of a drive crossing the large district Taipei is about 90 minutes, the threshold time value in the dispatching priority ranking table for the large district Taipei is set as 90 minutes.

Figure 8:
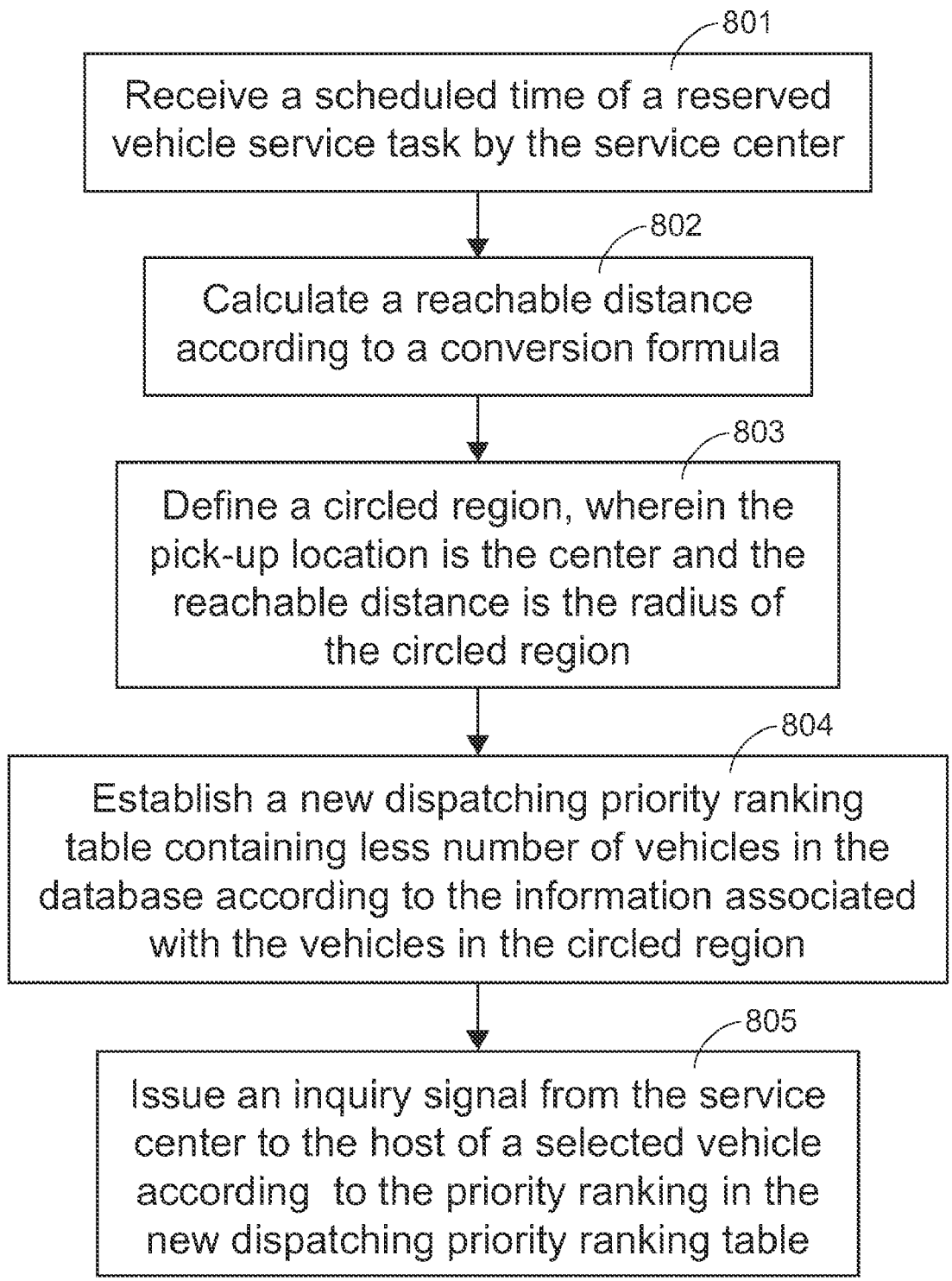
FIG. 8 is a flowchart illustrating a method of executing a selective mechanism for selecting a vehicle to accept a reserved vehicle service task.

FIG. 8 is a flowchart illustrating a method of executing a selective mechanism for selecting a vehicle to accept a reserved vehicle service task. First of all, a scheduled time of a reserved vehicle service task is received by the service center 10 (Step 801). According to a conversion formula, a reachable distance is calculated (Step 802). For example, according to the conversion formula, the reachable distance is equal to the schedule time (in minute) multiplied by 100 meters. Then, a circled region is defined, wherein the pick-up location is the center of the circled region and the reachable distance is the radius of the circled region (Step 803). Since the locations of all vehicles having the hosts can be realized by the service center 10 in real time, a new dispatching priority ranking table is established in the database according to the information associated with the vehicles in the circled region, so that the new dispatching priority ranking table has less number of vehicles (Step 804). Next, an inquiry signal is issued from the service center to the host of a selected vehicle according to the priority ranking in the new dispatching priority ranking table (Step 805). By this approach, the reserved vehicle service task in short scheduled time could be efficiently dispatched. Of course, this approach and the selective mechanisms of FIGS. 6 and 7 may be combined together to select the desired vehicle, thereby enhancing the service quality.

For encouraging the taxi driver to enhance service quality, the service center 10 could conduct a poll to gather the opinion of the customer by using a mobile phone, sending a short message or depressing a button of the host. According to the poll, the service rating of the taxi driver is calculated and thus a service quality parameter of the taxi driver is acquired. Furthermore, the taxi drivers having better service quality parameters could be included in a good driver dispatching priority ranking table. The contents of the good driver dispatching priority ranking table are similar to those of the dispatching priority ranking table, except that only the good drivers are included in the good driver dispatching priority ranking table. Since the good driver dispatching priority ranking table has less number of drivers, the good driver has more chance of accepting the vehicle service task. Furthermore, the identification codes of the good drivers could be simultaneously included in the dispatching priority ranking table and the good driver dispatching priority ranking table. In some embodiments, one good driver dispatching priority ranking table and several dispatching priority ranking tables are alternately used in order to increase the frequency of accepting the vehicle service task by the good drivers.

For assuring the selected vehicle of successfully implementing the reserved vehicle service task, after the dispatching signal is issued to the host of the selected vehicle and before the scheduled time (for example 20 minutes before the scheduled time), the service center 10 may issue a prompt message to the host of the selected vehicle to notify the driver to implement the reserved vehicle service task on the scheduled time. When the prompt message is received by the host of the selected vehicle, the host of the selected vehicle issues a reconfirming message to the service center 10. On the other hand, if the host of the selected vehicle is not enabled or the reconfirming message fails to be transmitted to the service center 10, the service center 10 will select another vehicle to implement the reserved vehicle service task. Of course, if the host of the selected vehicle is not enabled or doesn't issue the reconfirming message, the priority value of the host will be added by n and thus its priority ranking is lowered.

For helping the driver to well understand its priority ranking, the button 4010 of the dispatching unit 401 of the host 40 could be triggered to send a priority ranking inquiring signal to the service center 10. When the priority ranking inquiring signal is received, the service center 10 sends back the information associated with the vehicle's priority rankings in the dispatching priority ranking table and the good driver dispatching priority ranking table. Moreover, by trigging the button 4010 of the dispatching unit 401, the information associated with pick-up and drop-off of the vehicle service task could be sent back to the service center 10 for storage.

As described above, the vehicle-dispatching system and the vehicle-dispatching method of the prevent invention do obviate the drawbacks of the prior art so as to provide an efficient dispatching flow. The service center 10 could be implemented by a computer system having the capability to connect with the internet. For communicating with the service center 10, the host may be a network-enabled personal computer, or a mobile communication device using a 3G mobile phone network, a WiMAX wireless network or a Wi-Fi wireless network. The vehicle-dispatching system and the vehicle-dispatching method of the prevent invention could be widely applied to dispatch any forms of transportation tools for rent.

While the invention has been described in terms of what is presently considered to be the most practical and preferred embodiments, it is to be understood that the invention needs not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A vehicle-dispatching method for use with a service center and a plurality of vehicles, the vehicle-dispatching method comprising steps of:
   communicating the service center with hosts of respective vehicles, thereby establishing a database and a dispatching priority ranking table in the service center;
   selecting a vehicle from the database according to the dispatching priority ranking table when the service center receives a vehicle service request;
   issuing an inquiry signal from the service center to the host of the selected vehicle;
   issuing a vehicle service confirming signal from the host of the selected vehicle if the host of the selected vehicle receives the inquiry signal and consents to accept a vehicle service task; and
   adjusting the host of the selected vehicle to a lower priority ranking in the dispatching priority ranking table when the service center receives the vehicle service confirming signal from the host of the selected vehicle.

2. The vehicle-dispatching method according to claim 1 wherein the database of the service center stores information associated with all of the hosts and the corresponding vehicles, and the dispatching priority ranking table includes identification codes of all of the hosts and priority values corresponding to the identification codes, wherein the service center issues the inquiry signal to the selected vehicle having a highest priority ranking.

3. The vehicle-dispatching method according to claim 1 wherein the service center adjusts the selected vehicle to a lowest priority ranking in the dispatching priority ranking table when the service center receives the vehicle service confirming signal from the host of the selected vehicle; the hosts disconnected from the service center are temporarily rejected from the dispatching priority ranking table; and the hosts are restored to be added to the dispatching priority ranking table when the hosts are enabled and in communication with the service center.

4. The vehicle-dispatching method according to claim 1 wherein a good driver dispatching priority ranking table is established in the database according to a service quality parameter calculated according to a poll among customers via a mobile phone, a short message or depressing a button of the host, wherein the good driver dispatching priority ranking table and the dispatching priority ranking table are used to select a vehicle, and the service center issues the inquiry signal from the service center to the host of the selected vehicle.

5. The vehicle-dispatching method according to claim 1 wherein the service center issues a prompt message to the host of the selected vehicle before a scheduled time of the vehicle service task and waits for a reconfirming message to be issued from the host of the selected vehicle, wherein if the host of the selected vehicle is not enabled or the reconfirming message fails to be transmitted to the service center, the priority ranking of the host of the selected vehicle is lowered and the service center selects another vehicle to accept the vehicle service task.

6. The vehicle-dispatching method according to claim 1 wherein a priority ranking inquiring signal is issued from the host of the selected vehicle to the service center by triggering the host, and the service center sends back information associated with the priority rankings of the host in the dispatching priority ranking table when the priority ranking inquiring signal is received.

7. A vehicle-dispatching system for use with a plurality of vehicles, the vehicle-dispatching system comprising:
   a plurality of hosts disposed in respective vehicles; and
   a service center communicating with the plurality of hosts, thereby establishing a database and a dispatching priority ranking table in the service center, wherein the service center selects a vehicle from the database according to the dispatching priority ranking table when the service center receives a vehicle service request, an inquiry signal is issued from the service center to the host of the selected vehicle, and the host of the selected vehicle is adjusted to a lower priority ranking in the dispatching priority ranking table when the service center receives a vehicle service confirming signal from the host of the selected vehicle.

8. The vehicle-dispatching system according to claim 7 wherein the database of the service center stores information associated with all of the hosts and the corresponding vehicles, and the dispatching priority ranking table includes identification codes of all of the hosts and priority values corresponding to the identification codes, wherein the service center issues the inquiry signal to the selected vehicle having the highest priority ranking.

9. The vehicle-dispatching system according to claim 7 wherein the service center adjusts the selected vehicle to a lowest priority ranking in the dispatching priority ranking table when the service center receives the vehicle service confirming signal from the host of the selected vehicle; the hosts disconnected from the service center are temporarily rejected from the dispatching priority ranking table, and the hosts are restored to be added to the dispatching priority ranking table when the hosts are enabled and in communication with the service center.

10. The vehicle-dispatching system according to claim 7 wherein a good driver dispatching priority ranking table is established in the database according to a service quality parameter calculated according to a poll among customers via a mobile phone, a short message or depressing a button of the host, wherein the good driver dispatching priority ranking table and the dispatching priority ranking tables are used to select a vehicle, and the service center issues the inquiry signal from the service center to the host of the selected vehicle.

11. The vehicle-dispatching system according to claim 7 wherein the service center issues a prompt message to the host of the selected vehicle before a scheduled time of a vehicle service task and waits for a reconfirming message to be issued from the host of the selected vehicle, wherein if the host of the selected vehicle is not enabled or the reconfirming message fails to be transmitted to the service center, the priority ranking of the host of the selected vehicle is lowered and the service center selects another vehicle to accept the vehicle service task.

12. The vehicle-dispatching system according to claim 7 wherein a priority ranking inquiring signal is issued from the host of the selected vehicle to the service center by triggering the host, and the service center sends back information associated with the priority rankings of the host in the dispatching priority ranking table when the priority ranking inquiring signal is received.

13. A vehicle-dispatching method for use with a service center and a plurality of vehicles, the vehicle-dispatching method comprising steps of:
  communicating the service center with hosts of respective vehicles, thereby establishing a database and a dispatching priority ranking table in the service center, wherein the database includes dispatching condition sets of the respective vehicles;
  searching at least one of the vehicles from the database whether the vehicle matches a vehicle-requiring condition corresponding to a vehicle service request issued from a customer;
  selecting a matched vehicle from the database according to the dispatching priority ranking table when the service center receives the vehicle service request;
  issuing an inquiry signal from the service center to the host of the selected vehicle;
  issuing a vehicle service confirming signal from the host of the selected vehicle if the host of the selected vehicle receives the inquiry signal and consents to accept a vehicle service task; and
  adjusting the host of the selected vehicle to a lower priority ranking in the dispatching priority ranking table when the service center receives the vehicle service confirming signal from the host of the selected vehicle.

14. The vehicle-dispatching method according to claim 13 wherein the vehicle-requiring condition includes a scheduled time, and the dispatching condition set includes a task-accepting time, wherein the task-accepting time is actively modifiable via the host of the selected vehicle, a network-enabled personal computer or a mobile communication device.

15. The vehicle-dispatching method according to claim 13 wherein the vehicle-requiring condition includes an absolute vehicle-requiring condition and a preferential vehicle-requiring condition, wherein the vehicles whose dispatching condition sets do not match the absolute vehicle-requiring condition are not selected from the database, wherein the absolute vehicle-requiring condition includes a trunk-empty vehicle capable of providing a long-distance trip service, a smart-card acceptable vehicle, a credit-card acceptable vehicle or a vehicle having a wheelchair storing facility for elderly passengers, wherein the vehicles whose dispatching condition sets match the absolute vehicle-requiring condition and the preferential vehicle-requiring condition are preferentially selected, wherein the preferential vehicle-requiring condition includes a foreign language communicable vehicle such as an English communicable vehicle or a Japanese communicable vehicle, a large-sized vehicle having an air displacement greater than a threshold value, a vehicle having an age lower than two years or a high-quality vehicle with no customer complaint.

16. The vehicle-dispatching method according to claim 13 wherein data associated with a district group are inputted via the host of the vehicle, a network-enabled personal computer or a mobile communication device, and transmitted to the service center for modification, wherein the vehicle joins a large district and plural sub-districts belonging to the large district, so that the database is classified according to the data of the district group.

17. The vehicle-dispatching method according to claim 13 further comprising steps of:
  receiving a schedule time of a reserved vehicle service task by the service center;
  calculating a reachable distance according to a conversion formula; and
  defining a circled region, wherein a pick-up location is a center of the circled region and the reachable distance is a radius of the circled region, wherein the vehicle selected from the database is in the circled region.

18. A vehicle-dispatching system for use with a plurality of vehicles, the vehicle-dispatching system comprising:
  a plurality of hosts disposed in respective vehicles; and
  a service center communicating with the plurality of hosts to establish a database and a dispatching priority ranking table in the service center, the database including dispatching condition sets of the respective vehicles, wherein when the service center receives a vehicle service request issued from a customer, the service center selects a vehicle from the database according to the dispatching priority table matching according to a vehicle-requiting condition corresponding to the vehicle service request, and the service center issues an inquiry signal to the host of the selected vehicle, and the host of the selected vehicle is adjusted to a lower priority ranking in the dispatching priority ranking table when the service center receives a vehicle service confirming signal from the host of the selected vehicle.

19. The vehicle-dispatching system according to claim 18 wherein the vehicle-requiring condition includes a scheduled time, and the dispatching condition set includes a task-accepting time, wherein the task-accepting time is actively modifiable via the host of the selected vehicle.

20. The vehicle-dispatching system according to claim 18 wherein the vehicle-requiring condition includes an absolute vehicle-requiring condition and a preferential vehicle-requiring condition, wherein the vehicles whose dispatching condition sets do not match the absolute vehicle-requiring condition are not selected from the database, wherein the absolute vehicle-requiring condition includes a trunk-empty vehicle capable of providing a long-distance trip service, a smart-card acceptable vehicle, a credit-card acceptable vehicle or a vehicle having a wheelchair storing facility for elderly passengers, wherein the vehicles whose dispatching condition sets match the absolute vehicle-requiring condition and the preferential vehicle-requiring condition are preferentially selected, wherein the preferential vehicle-requiring condition includes a foreign language communicable vehicle such as an English communicable vehicle or a Japanese communicable vehicle, a large-sized vehicle having an air displacement greater than a threshold value, a vehicle having an age lower than two years or a high-quality vehicle with no customer complaint.

21. The vehicle-dispatching system according to claim 18 wherein data associated with a district group are inputted via the host of the vehicle, and transmitted to the service center for modification, wherein the vehicle joins a large district and plural sub-districts belonging to the large district, so that the database is classified according to the data of the district group.

22. The vehicle-dispatching system according to claim 18 wherein the vehicle is selected by steps of:
- receiving a schedule time of a reserved vehicle service task by the service center;
- calculating a reachable distance according to a conversion formula; and
- defining a circled region, wherein a pick-up location is a center of the circled region and the reachable distance is a radius of the circled region, wherein the vehicle selected from the database is in the circled region.

\* \* \* \* \*